United States Patent [19]

Zillgitt

[11] Patent Number: 5,896,011

[45] Date of Patent: Apr. 20, 1999

[54] DEVICE FOR CONTROLLING THE LIGHT WIDTH OF HEADLIGHTS FOR VEHICLES

[75] Inventor: Ulrich Zillgitt, Remshalden, Germany

[73] Assignee: Robert Bosch GmbH, Stuttgart, Germany

[21] Appl. No.: 09/133,795

[22] Filed: Aug. 13, 1998

[30] Foreign Application Priority Data

Oct. 2, 1997 [DE] Germany .............. 197 43 670

[51] Int. Cl.$^6$ .................................. B60Q 1/02
[52] U.S. Cl. ................ 315/82; 315/77; 362/71; 362/285
[58] Field of Search .............. 315/82, 77; 307/10.8; 362/71, 285, 286, 428

[56] References Cited

U.S. PATENT DOCUMENTS

| | | | |
|---|---|---|---|
| 4,583,152 | 4/1986 | Kawai et al. | 362/71 |
| 4,733,333 | 3/1988 | Shibata et al. | 362/40 |
| 4,968,896 | 11/1990 | Shibata et al. | 307/10.8 |

FOREIGN PATENT DOCUMENTS 30 48 751 A1  7/1982  Germany .

*Primary Examiner*—Don Wong
*Assistant Examiner*—Haissa Philogene
*Attorney, Agent, or Firm*—Michael J. Striker

[57] ABSTRACT

A device for controlling a light width of headlights of a vehicle said displacing units adapted to be associated with the headlights and operative for changing a light width of a light bundle emitted by the headlights, at least one sensor unit provided with at least one deflection sensor which detects a deflection of a vehicle body at least on one axle of the vehicle, an evaluating unit connected with the sensor unit and at least approximately determining an inclination γ of the vehicle body relative to a roadway from signals of the sensor unit and controlling the displacing units for at least approximately maintaining constant the light width of the light bundle emitted by the headlight, the at least one sensor unit being provided additionally with an inclination sensor which determines an inclination β of the vehicle body relative to a direction toward a center of gravity.

9 Claims, 2 Drawing Sheets

1

DEVICE FOR CONTROLLING THE LIGHT WIDTH OF HEADLIGHTS FOR VEHICLES

BACKGROUND OF THE INVENTION

The present invention relates to a device for controlling the light width of headlights for vehicles.

One of such devices is disclosed for example in the German patent document DE 30 48 751 A1. This device has adjusting unit associated with a headlight for changing the light width of the light beam emitted by the headlight. Furthermore, the device has a sensor unit with a deflection unit with which the deflection of the vehicle body is detected at least on one axle of the vehicle. Finally, the device has an evaluating unit which is connected with the sensor unit and the displacing units and determines from the signals of the sensor unit the inclination of the vehicle body, so as to control the displacing unit depending on it. This device has the disadvantage that the inclination of the vehicle body determined by the deflection sensor as a single sensor can not be sufficiently accurate under all conditions, so that faulty adjustments of the light width can be performed for the light beam emitted by the headlight.

SUMMARY OF THE INVENTION

Accordingly, it is an object of present invention to provide a device for controlling the light width of the headlights of vehicles which avoids the disadvantages of the prior art.

In keeping with these objects and with others which will become apparent hereinafter, one feature of present invention resides, briefly stated in a device for controlling a light width of a headlight for vehicles in which at least one sensor unit has additionally at least one inclination sensor for determination of the inclination $\beta$ of the vehicle body relative to a direction toward center of gravity.

When the device is designed in accordance with the present invention, it has the advantage that due to the additional inclination sensor, an additional signal via the change of the position of the vehicle body is obtained, so that with the evaluation unit, the inclination of the vehicle body can be determined with greater accuracy and thereby the light width of the light bundle emitted by the headlight can be controlled with a greater accuracy.

In accordance with additional feature of present invention, the sensor unit has only one deflection sensor which determines the deflection of the vehicle body on one axle, preferably the rear axle of the vehicle. This provides for an especially simple construction of the device, since only on one axle, the mounting of the deflection sensor must be provided.

In accordance with a further feature of the present invention, the at least one deflection sensor is formed as a rotary angle sensor, with which the turning $\alpha$ of a rotary lever articulately connected to the vehicle body and to the axle of the vehicle is determined. With this construction, a simple design of the deflection sensor is provided.

In accordance with still a further feature of present invention, the sensor unit additionally has a further inclination sensor with which the inclination $\delta$ is determined for a component which is connected with the axle of the vehicle during inward deflection and outward deflection of the axle relative to a direction toward the center of gravity. This increases the accuracy of the determination of the vehicle inclination and thereby the control of the light width.

Still a further feature of present invention resides in that the at least one deflection sensor and the at least one further inclination sensor are arranged on the same rotary lever and their angle $\alpha$ and inclination $\beta$ are determined. In this construction only one rotary lever is needed.

In accordance with an additional feature of present invention, the rotary lever forms a suspension part of the axle of the vehicle. Therefore, no additional rotary lever is needed.

Finally, the sensor unit and the evaluation unit can be assembled to form a single structural unit in a common housing arranged in the region of an axle of the vehicle. This provides for an especially simple construction of the device, since the displacing units and the sensor unit as well as the evaluation unit form only three components.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
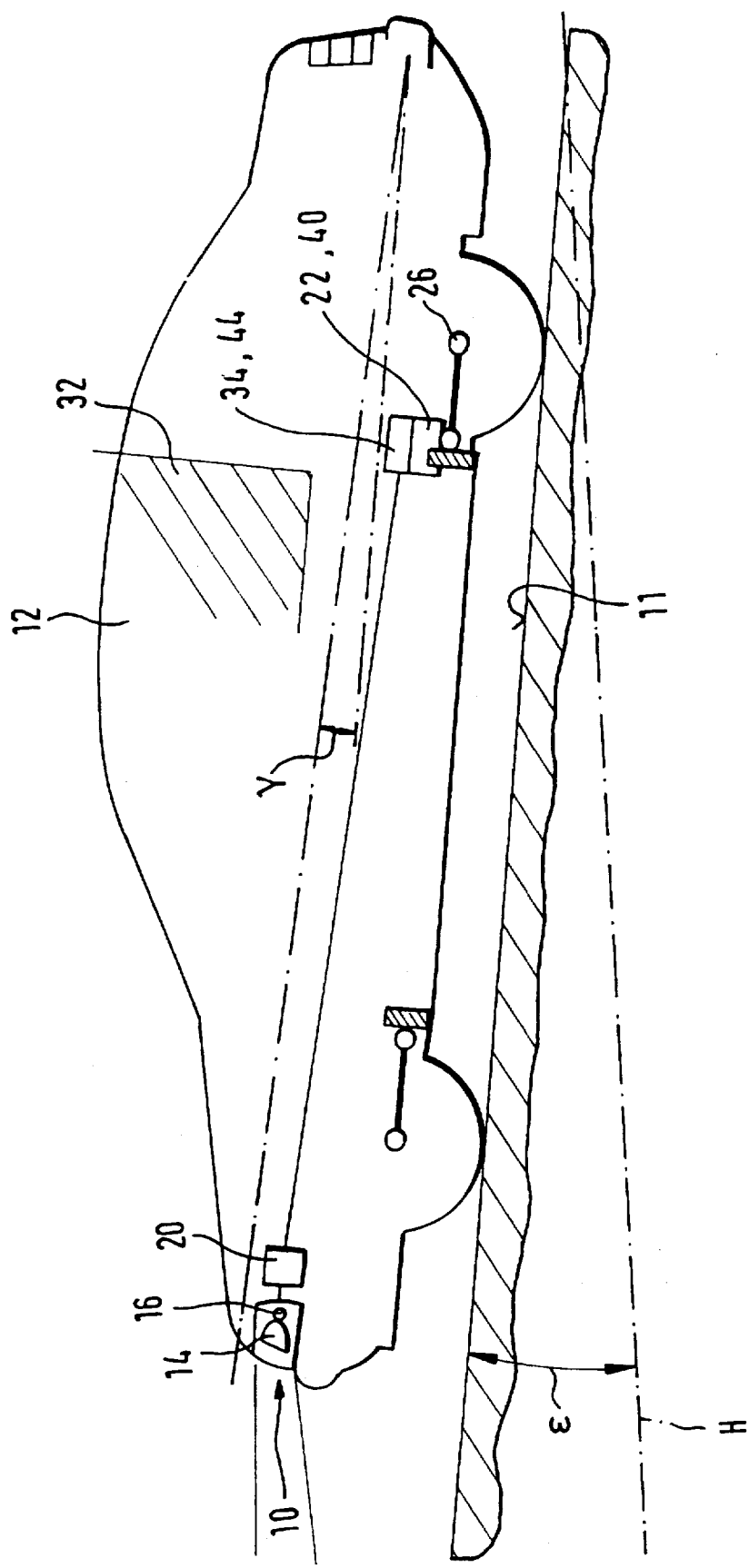
FIG. 1 shows a vehicle on a side view with a device for controlling a light width of its headlights.

A vehicle shown in FIG. 1, in particular motor vehicle, has on its front side at least two known dim light headlights 10, from which only one is shown in the drawing. The headlights 10 are connected with a body 12 of the vehicle, in particular with its chassis in a known manner. When the vehicle body 12 changes its inclination $\gamma$ relative to a roadway 11, the inclination of the headlights 10 and thereby the light width of the bundle emitted by it change as well. With a loading of the vehicle, the light width is increased which can lead to blinding of a traffic participant coming from the opposite side.

In order to provide an adjustment of the light width of the light bundle emitted by the headlight 10, the headlight 10 or at least their reflectors 14 are turned about a substantially horizontal axis 16. In order to maintain the light width of the light bundle emitted by the headlight 10 independent from the inclination $\gamma$ of the vehicle body 12 at least approximately, the device for controlling the light width is provided which will be explained in detail hereinbelow. The inclination $\gamma$ of the vehicle body 12 can change not only because of the loading, but also for example because of roadway unevenness, or because of braking or accelerating processes during the travel of the vehicle.

The device has displacing units 20 associated with the headlights 10, for turning the headlights 10 or their reflectors 14 around the axis 16. The displacing units 20 can be formed for example as drives, in particular an electric motor which, through a transmission, moves an adjusting element which engages the headlight 10 or its reflector 14 eccentrically to the axis 16. Alternatively, the displacing units 20 can be driven also pneumatically or hydraulically, and for this purpose corresponding pressure sources, such as for example pumps are provided.

Figure 2:
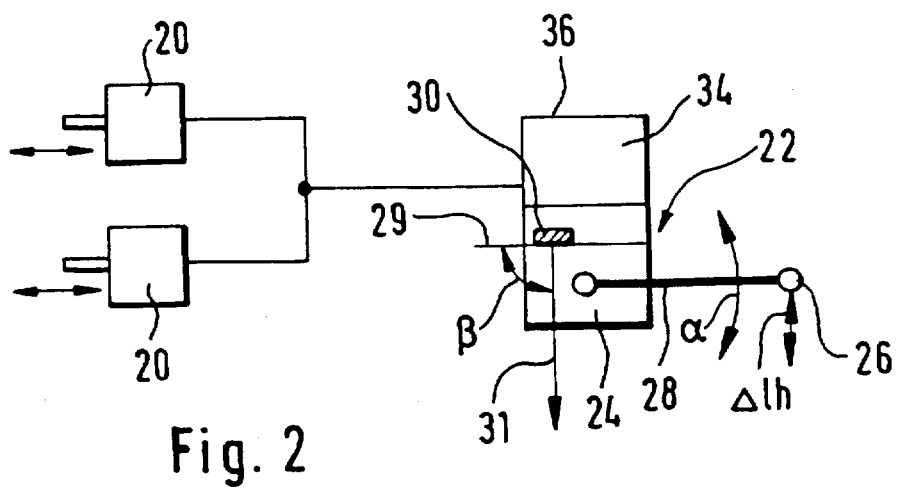
FIG. 2 is a view showing a section of a rear axle of the vehicle with a sensor unit for the inventive device in accordance with a first embodiment.

The device also has a sensor unit 22 which serves for producing signals, from which the inclination γ of the vehicle body 12 can be determined at least approximately. The sensor unit 22 in a first embodiment shown in FIG. 2 has a deflection sensor 24 which detects the deflection of the vehicle body 12 on an axle, for example the rear axle 26 of the vehicle. The deflection sensor 24 is formed for example as a rotary angle sensor. It detects the turning of a rotary lever 28 which is articulately connected on the one hand to the vehicle body 12 and on the other hand to the axle 26. It is proportional to the deflection of the vehicle body 12. The rotary lever 28 formed as a separate part provided only for the rotary angle sensor 24 or as a suspension part of the axle 26. During a deflection of the vehicle body 12 on the rear axle 26 by a distance Δ lh the rotary lever 28 performs a turning by an angle α, which is detected by the rotary angle sensor 24. The rotary angle sensor 24 can be formed for example in accordance with the Hall principle, in which during movement of a current permeated conductor in a magnetic field the produced electrical voltage is evaluated.

The sensor unit 22 also has an inclination sensor 30 which detects the inclination of the vehicle part on which it is arranged, relative to the direction of the center of gravity or center of Earth. With the inclination sensor 30, the angle β between the mounting plane 29 of the center 30 and the direction 31 to the center of gravity is detected. The inclination sensor is arranged on the vehicle body 12 so that it can detect the inclination of the vehicle body 12 relative to the direction 31 toward the center of gravity. The inclination sensor 30 is arranged so that its measuring plane extends in a vertical longitudinal plane 32 of the vehicle body 12. The inclination sensor 30 is assembled preferably with the rotary angle sensor 24 which determines the deviation, to form a unit assembled in particular in a common housing 36.

The rotary angle sensor 24 and the inclination sensor 30 are connected with an evaluating unit 34. The sensors 24, 30 supply electrical signals to the evaluating unit which determine the deviation and the inclination. From these signals approximately the inclination γ of the vehicle body 12 relative to the roadway 11 is determined in the evaluating unit 34. Predetermined combinations of the signals of the rotary angle sensor 24 and the inclination sensor 30 can be associated with predetermined inclinations γ of the vehicle body 12 relative to the roadway 11, with which a predetermined adjustment of the light width of the headlight 10 can be associated. With the evaluating unit 34, the displacing units 20 of the headlights 10 are controlled so that the light width of the light bundle emitted by the headlights 10 is adjusted at least approximately constant to the correct light width. The displacing units 20 contain a control circuit, so that their adjusting motors are automatically shut off when the predetermined adjustment is reached. Alternatively, the displacing units 20 can have for example drives formed by stepper motors which are controlled by the evaluating unit 34 with frequency signals. Therefore, the stepper motors operate only for the required time to move the headlights 10 to the position required for the predetermined light width. Preferably the evaluating unit 34 is also integrated in the structural unit with the sensor unit 22, in particular in the housing 36, so that only one structural unit is arranged in the region of the rear axle 26 of the vehicle and must be electrically connected.

Because of the characteristic of the deviation of the vehicle, only completely predetermined inclination angle β detected by the inclination sensor 30 can occur during a deviation of the rear axle 26 of the vehicle, and associated with it. The operation of the device is thereby determined with respect to a corresponding vehicle type, since for this type the characteristic relationship between the deviation of the rear axle 26 and the inclination of the vehicle body 12 relative to the direction of the center of gravity is provided.

The evaluation of the signals of the sensors 24, 30 by the evaluating unit 34 can be performed for example in standing position of the vehicle. In addition it is also possible to provide the evaluation of the signal of the sensors 24, 30 also during a driving phase of the vehicle, for example during traveling with a constant speed. Therefore a multiple testing of the signals of the inclination sensor 30 as to plausibility is performed. In this embodiment of the device, for controlling the light width only changes of the inclination γ of the vehicle body 12 are compensated, which are caused by a loading of the vehicle. With the inclination sensor 30 moreover accelerations or retardations of the vehicle are detected, since also the inclination γ of the vehicle body 12 relative to the direction 31 to the center of gravity changes. By a suitable evaluation of this signal of the inclination sensor 30 in the evaluating unit 34, a control of the light width of the headlight 10 during the travel of the vehicle is performed in which the changes of the inclination γ of the vehicle body 12 are compensated.

Figure 3:
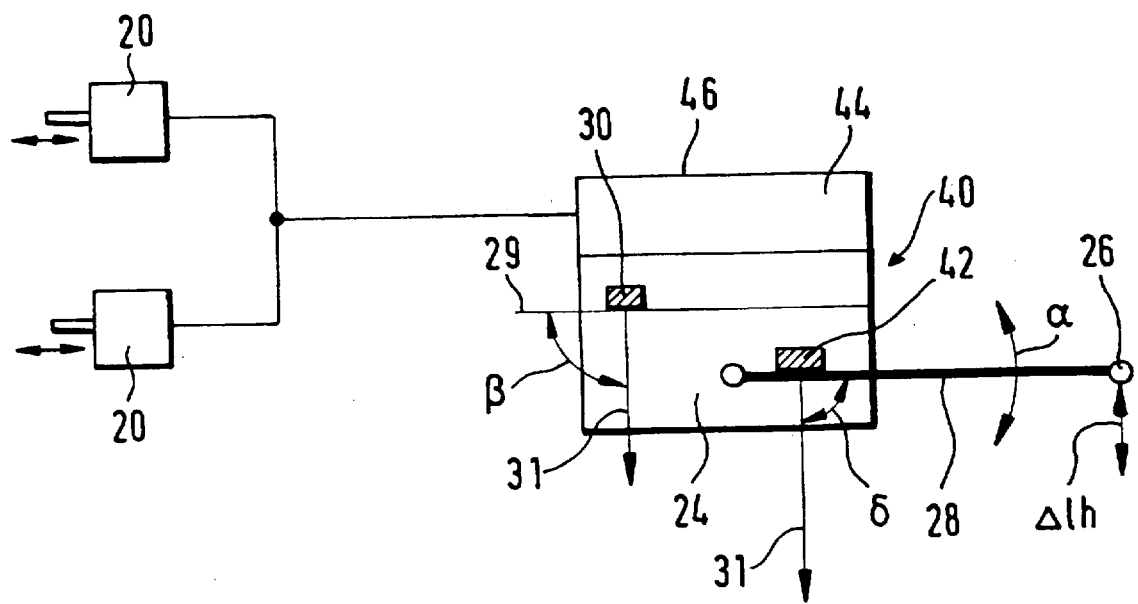
FIG. 3 is a view showing a section of the rear axle of the vehicle with a sensor unit of the inventive device in accordance with a second embodiment.

FIG. 3 shows the device for controlling the light width in accordance with a second embodiment, in which the displacing units 20 associated with the headlight 10 are provided as in the first embodiment. However, the design of the sensor unit 40 is modified. The sensor unit 40 has a deviation sensor 24 formed similarly to the first embodiment, which is formed for example as a rotary angle sensor. It detects a turning α of the rotary lever 28 articulately connected to the rear axle 26 of the vehicle and to the vehicle body 12. In addition the sensor unit 40 has the inclination sensor 30 arranged on the vehicle body 12 and detecting the inclination angle β between the mounting plane 29 of the sensor 30 on the vehicle body 12 relative to the direction 31 toward the center of gravity.

The sensor unit 40 additionally has a further inclination sensor 42. It detects the inclination angle γ of a component which performs an angle change during deviation in and out of the rear axle 26 of the vehicle relative to the direction 31 toward the center of gravity. Preferably, the further inclination sensor 42 is arranged on the rotary lever 28, whose turning α is detected by the rotary angle sensor 24 and which moreover forms for example a suspension part of the rear axle 26. Alternatively, the further inclination sensor 42 can be arranged separately from the rotary lever 28. In this case, the inclination change of the rotary lever 28 is transmitted through a suitable deviating device to the further inclination sensor 42. The three sensors 24, 30, 42 as well as the evaluating unit 44 are assembled for example to form a joint structural unit which has a common housing 46.

The evaluating unit 44 receives through the rotary angle sensor 24 a signal about the deviation of the vehicle body 12 on the rear axle 26, through the inclination sensor 30 a signal about the inclination β of the vehicle body 12 relative to the direction 31 toward the center of gravity, and through the further inclination sensor 42 a signal for the inclination δ of the rotary lever 28 relative to the direction 31 toward the center of gravity.

From the signals of these three sensors 24, 30, 42, the inclination γ of the vehicle body 12 relative to the roadway 11 can be determined by the evaluating unit 34 with high accuracy. With the signals of the rotary angle sensors 24 and the further inclination sensor 42, the inclination ε of the roadway 11 relative to the horizontal can be determined and eliminated. Thereby it is possible to separate the detected inclination ε of the roadway 11 from the signal of inclination sensor 30, so that the inclination γ of the vehicle body 12 relative to the roadway 11 can be determined, which is caused by a loading of the vehicle or by acceleration or retardation of the vehicle.

As described with respect to the first embodiment, it is also possible in the device in accordance with a second embodiment that the evaluation can be performed only with the standing vehicle body by the evaluating unit 44 from the signals of the sensors 24, 30, 42, and the light width of the headlight 10 can be correctly adjusted. In this case only the changes of the inclination γ of the vehicle body 12 relative to the roadway 11 due to loading of the vehicle can be compensated.

Alternatively, this evaluation can be performed only in traveling vehicle, so that also the changes of the inclination γ of the vehicle body 12 relative to the roadway 11 caused by accelerations and retardations of the vehicle can be compensated.

The device for controlling the light width of the light bundle emitted by the headlight 10 in accordance with the above described embodiments is designed so that it suffices to provide only the displacing devices 20 associated with the headlights 10, which can be formed identically for both headlights 10, as well as the structural unit including the sensor units 22 or 40 and the evaluating units 24 or 44. Therefore, it has a very simple construction.

It will be understood that each of the elements described above, or two or more together, may also find a useful application in other types of constructions differing from the types described above.

While the invention has been illustrated and described as embodied in device for controlling the light width of headlights for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for controlling a light width of headlights of a vehicle, comprising displacing units adapted to be associated with the headlights and operative for changing a light width of a light bundle emitted by the headlights; at least one sensor unit provided with at least one deflection sensor which detects a deflection of a vehicle body at least on one axle of the vehicle; an evaluating unit connected with said sensor unit and at least approximately determining an inclination γ of the vehicle body relative to a roadway from signals of said sensor unit and controlling said displacing units for at least approximately maintaining constant the light width of the light bundle emitted by the headlight, said at least one sensor unit being provided additionally with an inclination sensor which determines an inclination β of the vehicle body relative to a direction toward a center of gravity.

2. A device as defined in claim 1, wherein said sensor unit has only one said deflection sensor operative to detect a deflection of the vehicle body on one axle of the vehicle.

3. A device as defined in claim 2, wherein said only one deflection sensor is operative for detecting a deviation of the vehicle body on a rear axle of the vehicle.

4. A device as defined in claim 1, wherein said inclination sensor is arranged so that a measuring plane of said inclination sensor is adapted to extend at least approximately in a vertical longitudinal plane of the vehicle body.

5. A device as defined in claim 1, wherein said at least one deflection sensor is formed as a rotary angle sensor and detects a turning α of a turning lever articulately connected to the vehicle body and to the axle of the vehicle.

6. A device as defined in claim 1, wherein said sensor unit additionally has at least one further inclination sensor, said additional inclination sensor being operative for detecting an inclination β of a component which is connected with the axle of the vehicle and performs an inclination change during deflection of the axle in and out, relative to a direction toward the center of gravity.

7. A device as defined in claim 6, wherein said at least one deflection sensor and said at least one further inclination sensor are formed so as to detect on a same rotary lever articulately connected to the vehicle body and to the axis of the vehicle a rotary angle and an inclination δ of the turning lever.

8. A device as defined in claim 7, wherein the rotary lever forms a suspension part of the axle of the vehicle.

9. A device as defined in claim 1, wherein said sensor unit and said evaluating unit are assembled to form a single assembly in a common housing arranged in the region of the axle of the vehicle.

* * * * *